(12) United States Patent
Leung et al.

(10) Patent No.: US 7,722,218 B2
(45) Date of Patent: May 25, 2010

(54) METHOD OF AND DEVICE FOR ATTRACTING AQUATIC LIFE FORMS USING AN ELECTROMAGNETIC FIELD GENERATION

(76) Inventors: Wing Fai Leung, G. concept Technology Limited of Room B, 10th Floor, Kingpower Commercial Building, 409-413 Jaffe Road, Wanchai (HK); Po Fong Cheng, G. concept Technology Limited of Room B, 10th Floor, Kingpower Commercial Building, 409-413 Jaffe Road, Wanchai (HK); Vidar Saue, Nybovegen 12, 5221 Nesttun (NO)

( * ) Notice: Subject to any disclaimer, the term of this patent is extended or adjusted under 35 U.S.C. 154(b) by 412 days.

(21) Appl. No.: 11/880,191

(22) Filed: Jul. 19, 2007

(65) Prior Publication Data
US 2009/0310331 A1    Dec. 17, 2009

Related U.S. Application Data

(60) Provisional application No. 60/934,776, filed on Jun. 14, 2007.

(51) Int. Cl.
*F21L 4/00* (2006.01)
*A01K 85/01* (2006.01)

(52) U.S. Cl. .................... 362/253; 362/84; 43/17.5; 43/17.6

(58) Field of Classification Search ............. 362/253, 362/84, 157, 158, 267, 800, 234; 441/13, 441/16, 17, 18; 43/17.5, 17.6
See application file for complete search history.

(56) References Cited

U.S. PATENT DOCUMENTS

| 2,002,135 | A | | 5/1935 | Barton | |
|---|---|---|---|---|---|
| 3,340,643 | A | | 9/1967 | Weimer | |
| 4,175,348 | A | | 11/1979 | Ray | 43/17.6 |
| 4,553,194 | A | * | 11/1985 | Bailey | 362/267 |
| 4,627,187 | A | * | 12/1986 | Williams | 43/17.1 |
| 5,175,951 | A | | 1/1993 | Fruchey | 43/17.6 |
| 5,737,867 | A | * | 4/1998 | Tsutsumi et al. | 43/17.6 |
| 6,029,388 | A | * | 2/2000 | Yokogawa et al. | 43/17.6 |
| 6,203,170 | B1 | | 3/2001 | Patrick et al. | 362/234 |
| 6,776,502 | B2 | * | 8/2004 | Hung | 362/158 |
| 2002/0050091 | A1 | | 5/2002 | Jackson, II | 43/42.31 |

(Continued)

FOREIGN PATENT DOCUMENTS

CA          897418          4/1972

(Continued)

*Primary Examiner*—Bao Q Truong
(74) *Attorney, Agent, or Firm*—JAG Patent Services LLC; James A. Gavney, Jr.

(57) ABSTRACT

A device for simulating and/or attracting aquatic life forms is disclosed. The device includes an electromagnetic module for simultaneously generating alternating or pulsed electromagnetic fields and a pulsed light output from a light emitting diode. The electromagnetic module includes a dry battery that is activated when exposed electrodes of the dry battery are placed in contact with a common electrolyte, such as sea water. The electromagnetic module includes a control circuit with one or more application specific integrated circuits for converting an input voltage from the dry battery to an operating voltage sufficient to power the light emitting diode. In further embodiments of the invention, the device includes one or more removable jackets that resemble aquatic life-forms.

24 Claims, 14 Drawing Sheets

U.S. PATENT DOCUMENTS

| | | | |
|---|---|---|---|
| 2004/0216355 A1* | 11/2004 | Gore | 43/17.5 |
| 2006/0265932 A1 | 11/2006 | Davis | 43/17.1 |
| 2007/0220798 A1* | 9/2007 | Davidson | 43/4 |

FOREIGN PATENT DOCUMENTS

| | | |
|---|---|---|
| DE | 20 2004 006 738 U1 | 7/2004 |
| EP | 0 331 518 A1 | 3/1989 |
| FR | 2 730 130 | 8/1996 |
| WO | WO 01/07829 A1 | 2/2001 |
| WO | WO 02/089568 A1 | 11/2002 |
| WO | WO 2005/065451 A1 | 7/2005 |

* cited by examiner

METHOD OF AND DEVICE FOR ATTRACTING AQUATIC LIFE FORMS USING AN ELECTROMAGNETIC FIELD GENERATION

RELATED APPLICATION

This Application claims priority under 35 U.S.C. §119(e) from the Co-pending U.S. Provisional Patent Application Ser. No. 60/934,776, filed on Jun. 14, 2007, and titled "METHOD AND DEVICE FOR SIMULATION OF MARINE LIGHT ORGAN WITH ELECTROMAGNETIC FIELD GENERATION", the contents of which are hereby incorporated by reference.

FIELD OF THE INVENTION

This invention relates to aquatic articles. More particularly, the present invention relates to aquatic articles for attracting marine life.

BACKGROUND OF THE INVENTION

As early as 1917, scientific studies had discovered that some sea organisms, including fish, respond to electromagnetic fields and light generated within their aquatic environments. Scientists have shown that catfish in an aquarium exhibit an immediate reaction when an electromagnetic field is applied to water within the aquarium. By the 1950s hundred of fish species were classified and ranked by their degree of response to electromagnetic fields.

It has further been discovered that many fish are capable of sensing electromagnetic impulses generated by other fishes. In fact, some marine research has indicated that some fish, such as sharks, salmon, sturgeon and trout, possess active nerve cells on their bodies that act as electro-receptors that sense electromagnetic fields and can detect changes in the electromagnetic fields, moving ions and charged particles within their aquatic surroundings. Research has shown that some marine life-forms are able to effectively detect and monitor ultraviolet light and/or electro magnetic fields to navigate and locate prey in their aquatic environments.

The research has indicated that a number of marine life species can see or detect objects in water that emit ultraviolet light in the ultraviolet light spectrum of (320 nm-400 nm). This is at least in part because the retinal cones of fish eyes are sensitive to objects that emit ultraviolet light against a dark back drop of deep ocean water. Another reason is that ultraviolet light is effective at attracting marine life is that violet light exhibits a low absorption coefficient in an aquatic environment and, therefore, can be detected by marine life from a distance in aquatic environments.

SUMMARY OF THE INVENTION

The device of the present invention is configured to simultaneously generate an alternating or pulsed electromagnetic field from a dry battery and a pulsed light output generated from a light source that is powered by the dry battery. The device can be used for simulating and/or attracting aquatic life forms. The device can, for example, attract shrimp, fish, squid, octopus plankton and other aquatic life forms. The device includes what is referred to herein as an electromagnetic module. The electromagnetic module includes a dry battery. A dry battery herein refers to a battery without a contained electrolyte. The dry battery includes at least two electrodes that are partially exposed to the atmosphere. The dry battery is configured to generate a current when portions of the exposed electrodes are placed in a common electrolyte. Preferably, the dry battery is configured to generate a current when the portions of the exposed electrodes are placed in a common aquatic environment, such as the sea or the ocean. The electrodes are formed from any suitable materials. Preferably, the electrodes include a magnesium anode and a gold cathode. In accordance with an embodiment of the invention, one or more of the electrodes are configured to be replaceable.

The device of the present invention also includes a light source electrically coupled to the dry battery and configured to be powered by the dry battery when portions of the exposed electrodes are placed in a common aquatic environment (electrolyte). The light source preferably includes one or more light emitting diodes that emit green, blue, or white light or a combination thereof.

The device also includes a control circuit electrically coupled to the dry battery and the light source. The control circuit can include any number of application specific integrated circuits for controlling the current from the battery and a light output from the light source. Preferably, the control circuit is configured to generate pulsed electromagnetic fields and a pulsed light output from the light source.

In accordance with the preferred embodiment of the invention, the control circuit and the light source are sealed within a translucent water proof enclosure to form an electromagnetic module. Preferably, the electromagnetic module is configured to fit into and/or attach to one or more housing structures that are fashioned to simulate aquatic life forms. The housing structures are, for example, fashioned to simulate shrimp, fish, squid and octopus, to name a few aquatic life-forms. The housing structures and/or the electromagnetic module can include a fluorescent material, a fluorescent structure, or fluorescent decals that include fluorescent paint. The fluorescent material, fluorescent structure and or fluorescent decals glow upon exposure to light from the light source.

The device of the present invention can include any number of optical elements including, but not limited to, reflectors, diffusers and lenses. The device can also include a user interface that allows a user to select a mode of operation for the device, including a rate at which light is pulsed from the light source.

DETAILED DESCRIPTION OF THE INVENTION

Figure 1:
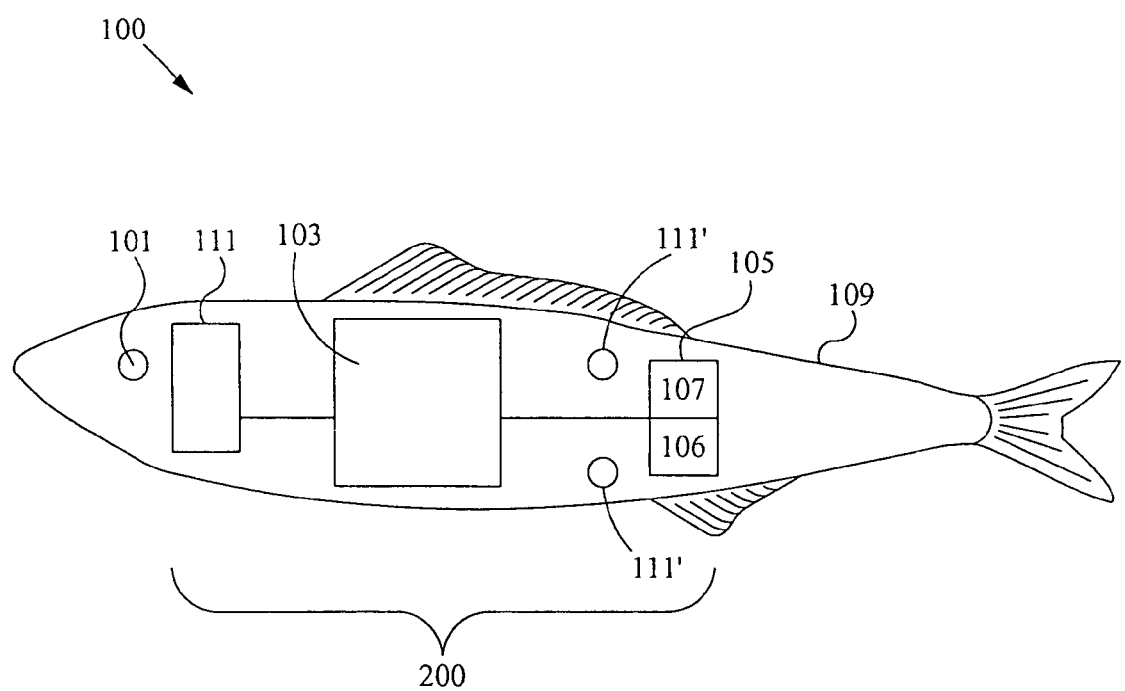
FIG. 1 is a schematic representation of a device with an electromagnetic module, in accordance with the embodiments of the invention.

Referring to FIG. 1, the present invention is directed to a device 100 for simulating and/or attracting aquatic life forms. The device 100 includes what is referred to herein as an electromagnetic module 200. The electromagnetic module 200 includes a dry battery 105. A dry battery herein refers to a battery without a contained electrolyte. The dry battery 105 includes at least two electrodes 106 and 107 that are partially exposed to the atmosphere. The dry battery 105 is configured to generate a current when portions of the exposed electrodes 106 and 107 are placed in a common electrolyte. Preferably the dry battery 105 is configured to generate a current when the portions of the exposed electrodes 106 and 107 are placed in a common aquatic environment, such as the sea or the ocean. The electrodes 106 and 107 preferably comprise magnesium and gold because these metal are environmentally friendly.

For example, the dry battery 105 can include a magnesium anode 106 and a gold cathode 107. Sea water as an electrolyte includes ions of $H^+$, $OH^-$, $Na^+$, $Cl^-$ and $H_2O$. When the magnesium anode 106 and the gold cathode 107 of the dry battery 105 are immersed or partially immersed in sea water, the magnesium anode 106 oxidizes and forms magnesium ions according the following reaction:

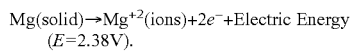

$Mg(solid) \rightarrow Mg^{+2}(ions) + 2e^- +$ Electric Energy $(E = 2.38V)$.

At the same time, the $H^+$ ions from the sea water migrate to a surface of the gold cathode 107 where the $H^+$ ions are reduced to form hydrogen gas according to the following reaction:

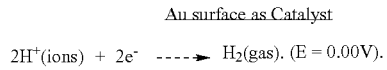

Au surface as Catalyst $2H^+(ions) + 2e^- \rightarrow H_2(gas)$. $(E = 0.00V)$.

The potential difference of electric field between the solid magnesium anode 106 and the gold cathode 107 is about 2.38V. The actual potential difference of the dry battery 105 depends upon a number of factors including temperature, ion concentration, oxygen content, and the purity of the sea water, as well the surface resistance of the magnesium anode 106. The nominal voltage of an actual Mg—Au salt water battery is about 1.2V.

Still referring to FIG. 1, the device 100 of the present invention also includes a light source 101 that is electrically coupled to the dry battery 105 through a control circuit 103, which is preferably an integrated circuit. The light source 101 is configured to be powered by the dry battery 105 when portions of the exposed electrodes 106 and 107 are placed in a common aquatic environment. The light source 105 preferably includes one or more light emitting diodes.

Because the nominal voltage of the actual magnesium/gold salt water battery is about 1.2V, which is well below the voltage required to operate and maintain a continuous light output from a light emitting diode, the present invention includes a circuit design such that the control circuit 103 controls the power output supplied by the dry battery 105 and controls the light output from the light source 101 and the magnetic field generated from the dry battery 105 to be pulsed.

Figure 10:
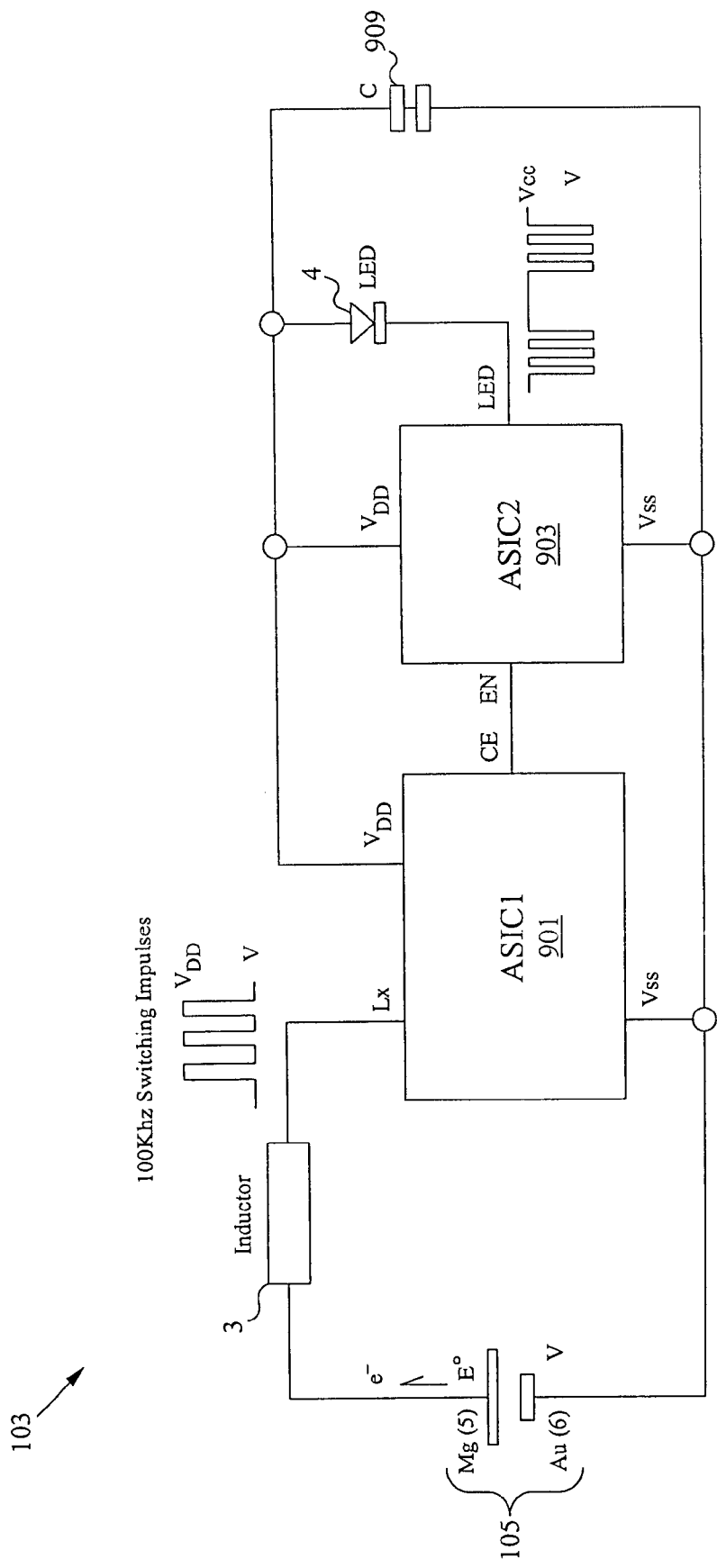
FIG. 10 shows a schematic representation of a control circuit used to control the voltage output and light output from an electromagnetic module, in accordance with the embodiments of the invention.

Specifically the control circuit 103 includes a first application specific integrated circuit 901 (FIG. 10). The first application specific integrated circuit (ASIC1) 901 converts power from dry battery 105 to an operating voltage $V_{DD}$ that powers a second application specific integrated circuit (ASIC2) 903 (FIG. 12) and pulses the light emitting diode. The first application specific integrated circuit 901 generates both a switching voltage pulse (Lx) and an alternating electromagnetic field (FIG. 10) in part by using an inductor 3 (FIG. 10)

In operation, a voltage from the dry battery 105 is applied to the first application specific integrated circuit 901. The first application specific integrated circuit 901 utilizes internal Pulse Frequency Modulation or a Pulse Width Modulation switching technique and a negative feedback looping process with a duty cycle sufficient to control and to efficiently boost the output voltage generated $V_{DD}$ to a value that is suitable to power a light emitting diode light source. The application specific integrated circuit 901 of the present invention is capable of a voltage conversion from an input voltage of 250 mV from the dry battery 105 to generate and the output voltage VDD of 3V or higher.

The control circuit 103 and light source 101 of the electromagnetic module 200 are preferably encapsulated within a translucent enclosure 9 (FIGS. 2A-B) by the process of injection molding using transparent plastics or by pouring a plastic resin over the components to be encapsulated.

Figure 2A:
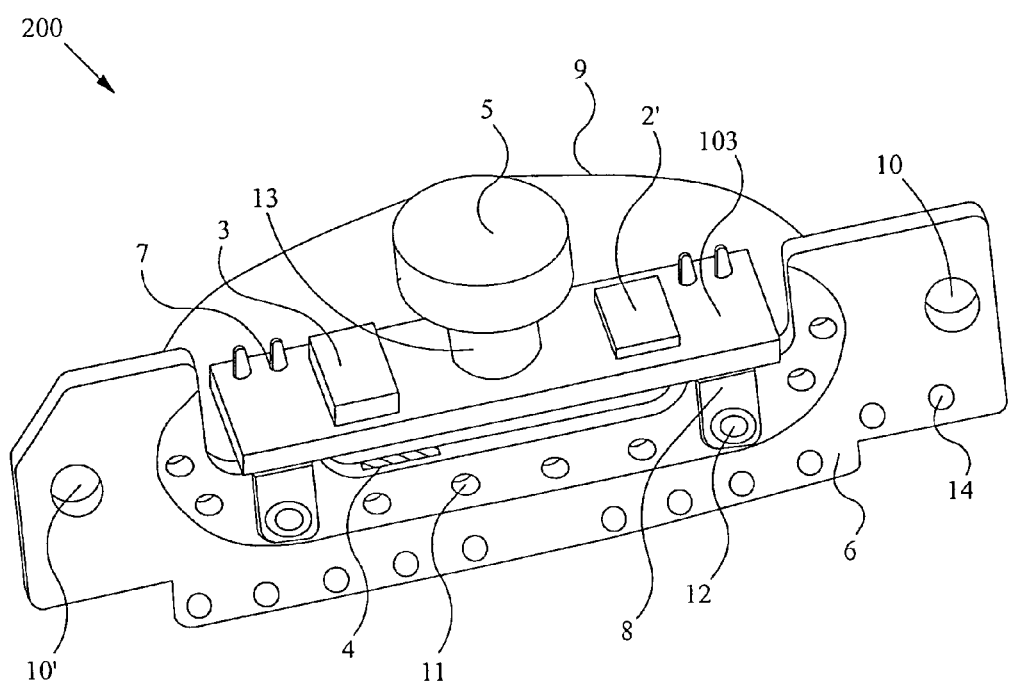
FIGS. 2A-B show representations of an electromagnetic module, in accordance with a preferred embodiment of the invention.

Referring to FIGS. 1, 2A an 2B, the device 100 of the present invention further includes one or more jackets or housing structures 109 that are fashioned to appear like or simulate aquatic life forms such as shrimp, fish, squid and octopus, to name a few life-forms. The jackets or housing structures 109 and/or the electromagnetic module 200 can include fluorescent materials, fluorescent structures, decals or paint that glow upon exposure to light from the light source of other light source, as described above and below. Where the electromagnetic module 200 is encased by a jacket or housing structure 109, the jacket or housing structure 109 preferably includes holes 111, 111' and 111" in order to allow the electrodes be exposed to water and/or allow light and ions to flow out from the jacket or housing structure 109. Also, the electromagnetic module 200 and or the jacket or housing structure 109 can be equipped with any number of holes, loops, hooks, hinged and the like to allow the device 100 to be coupled with fishing implements and used as a fishing lure.

Figure 2B:
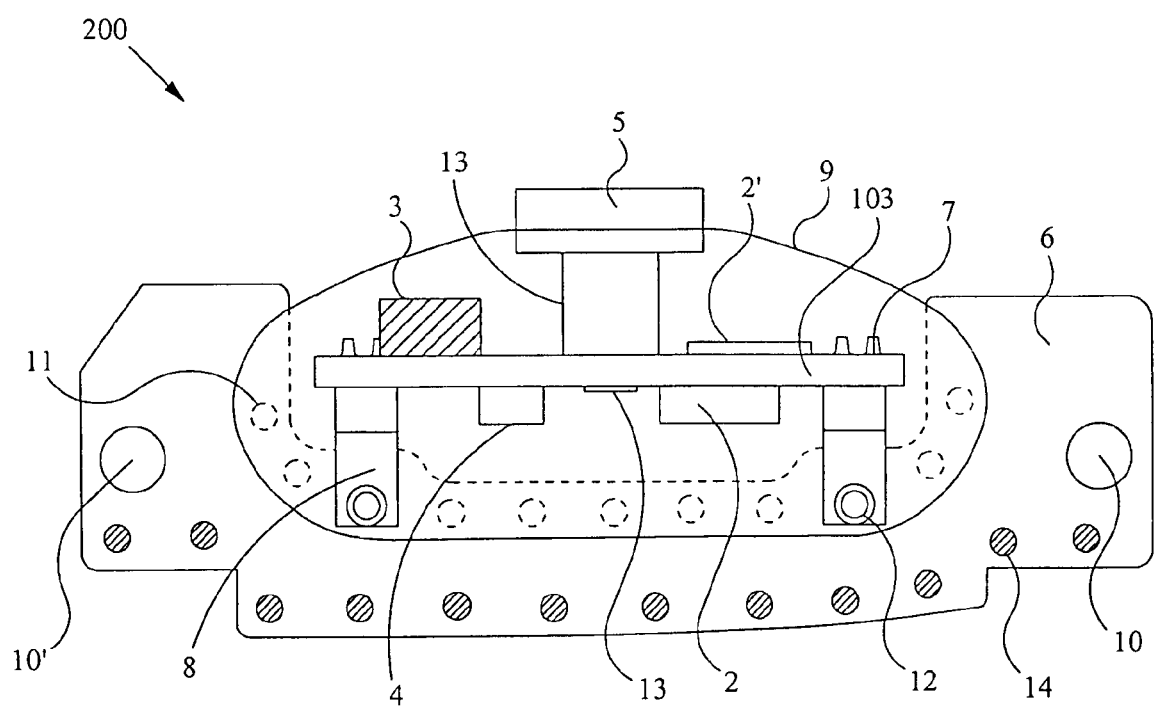

FIGS. 2A-B show an electromagnetic module 200 in accordance with the preferred embodiment of the invention. Here and throughout this specification the same reference number are used to denote similar structural features. The electromagnetic module 200 includes a magnesium anode and a gold cathode 6. The electromagnetic module 200 also includes the control circuit 103 with power contacts 7 and an inductor 3. The control circuit 103 includes any number of application specific integrated circuits 2 and 2' to generate a pulsating electromagnetic field and a pulsed light output from a light emitting diode 4, such as described above and below. The magnesium anode 5 is electrically couple to the control circuit 103 through one or more contacts 13 and the gold cathode 6 is electrically coupled to the control circuit 103 thought metal solder tabs 8 and metal eyelets 12. Preferably the control circuit 103 and the light emitting diode 4 are encased in the translucent water proof enclosure 9. The gold cathode 6 can include holes 10 and 10' that allows the electromagnetic module 200 to be coupled to fishing equipment or housing structures fashioned to represent aquatic life forms. The gold cathode 6 in accordance with the embodiments of the invention includes fluorescent paint 14 that will glow in the absence of light being emitted from the light emitting diode 4. Also, the electromagnetic module 200 can include any number of punctures 11 through the gold cathode 6 that help the enclosure 9 bond to the gold cathode 6 during its formation and help to form a pressure resistant enclosure 9.

Figure 3:
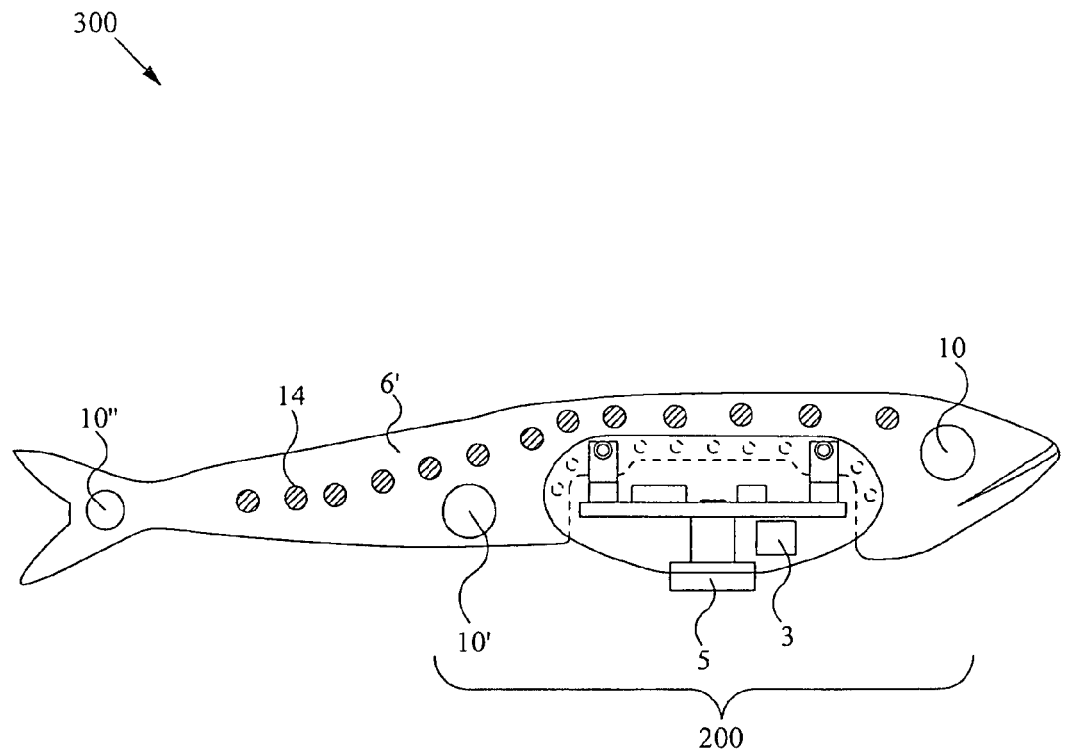
FIG. 3 shows a fishing lure 300 with an electromagnetic module, in accordance with the embodiments of the invention.

FIG. 3 shows a fishing lure 300 with an electromagnetic module 200, in accordance with one embodiment of the invention. The fishing lure 300 includes an electromagnetic module 200 with the control circuit 103, the inductor 3 and light emitting diode 4, such as described above. The module 200 also includes a magnesium anode 5 and a gold cathode 6'. The gold cathode 6', in accordance with this embodiments of the invention is shaped like fish. The gold cathode 6' includes areas or regions of fluorescent paint 14 and preferably has holes 10, 10' and 10", such that the fishing lure 300 can be coupled to other fishing equipment.

Figure 4:
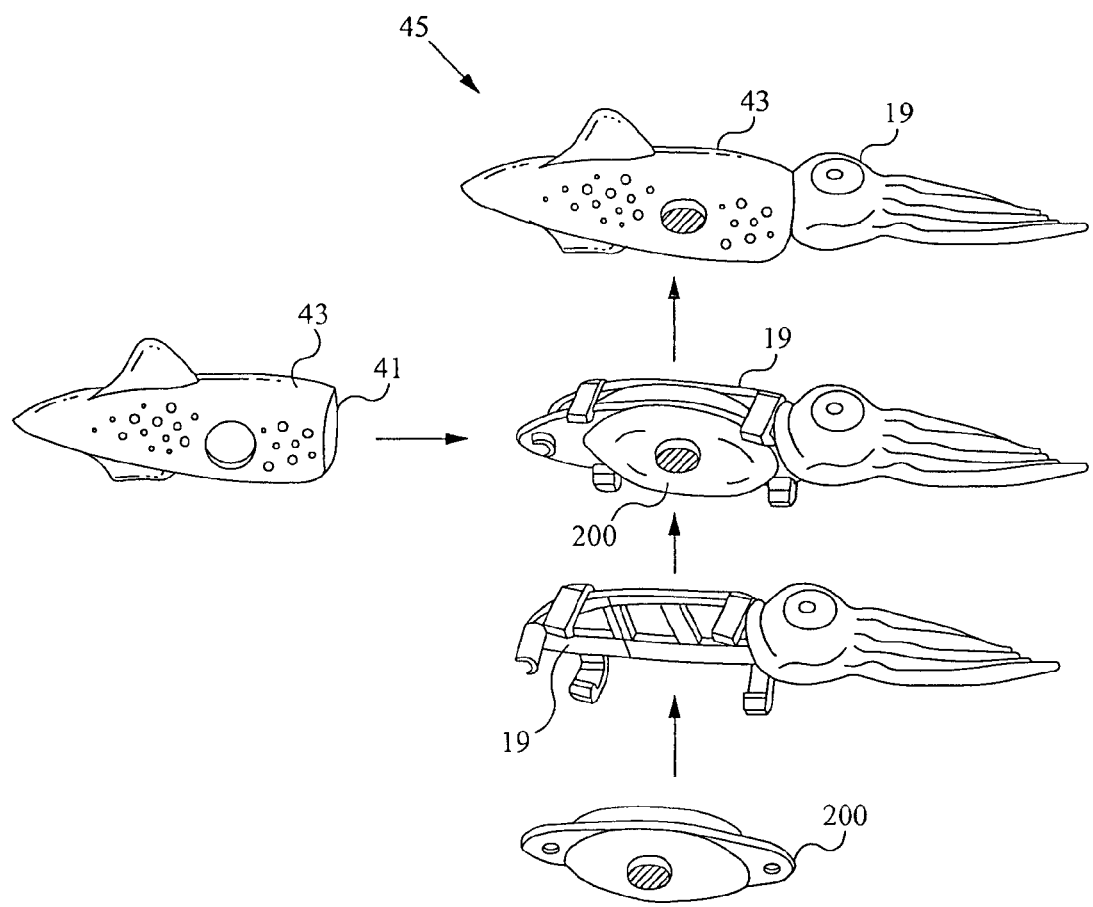
FIGS. 4-6 are exploded views of a device with an electromagnetic module configured to couple to a housing structures or jackets fashioned to represent aquatic life forms, in accordance with the embodiments of the invention.

FIG. 4 shows a device with an electromagnetic module 200, such as described above. The device further includes a cage 19 that clips or snaps onto the electromagnetic module 200. The device also includes an interchangeable lure jacket or housing structure 43. The cage 19 with the electromagnetic module 200 attached thereto fits into opening 41 of the lure jacket or housing structure 43 to form a functional fishing lure 45 that resembles or represents a squid. Preferably, the lure jacket or housing structure 43 is translucent and/or includes openings or holes that allows light to escape from the device as the device is being operated. Also the holes are necessary to allow ions and water to flow in and out of the device as the device is being operated.

Figure 5:
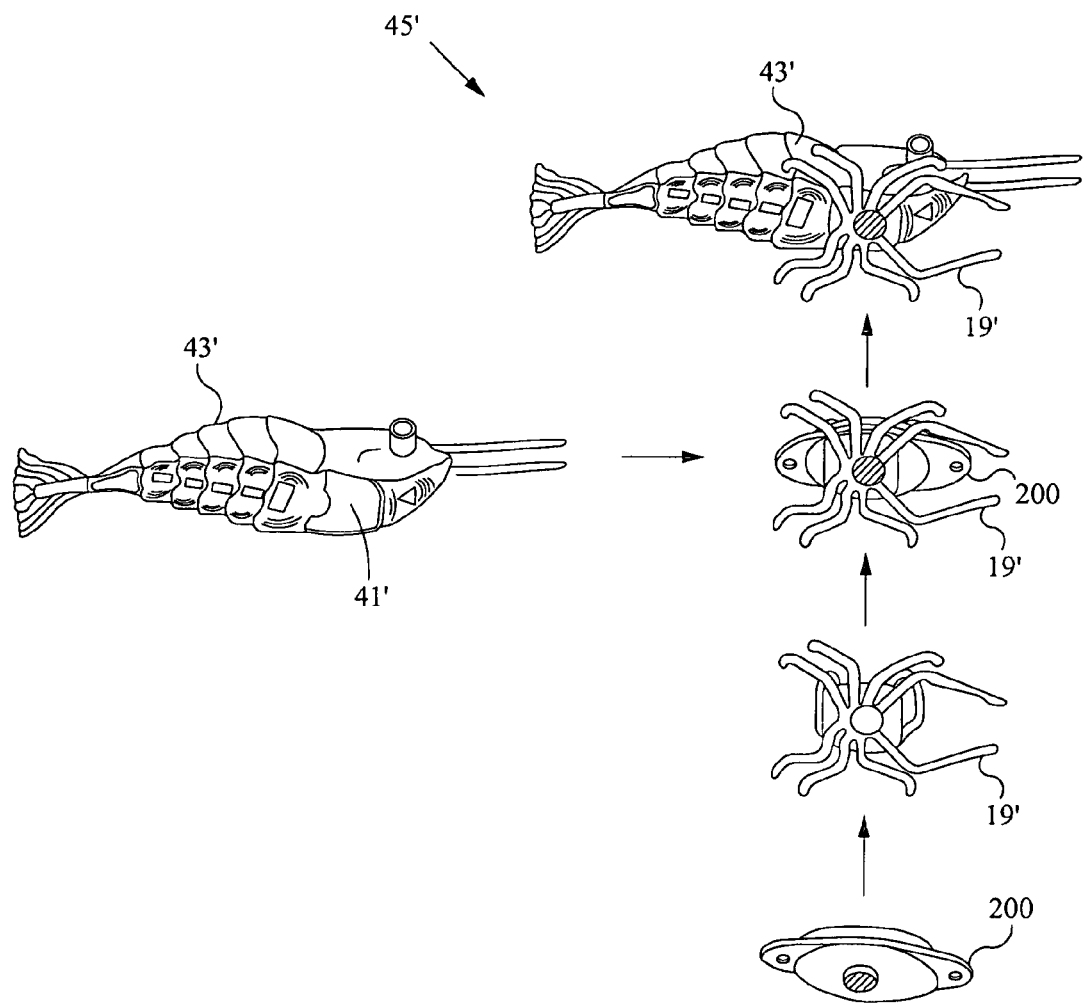

FIG. 5 shows a device with an electromagnetic module 200, such as described above. The device further includes a cage 19' that clips or snaps onto the electromagnetic module 200. The device also includes an interchangeable lure jacket and/or housing structure 43'. The cage 19' with the electromagnetic module 200 attached thereto fits into an opening 41' of lure jacket and/or housing structure 43' to form a functional fishing lure 45' that resembles or represents a shrimp. Preferably, the lure jacket and/or housing structure 43' is translucent and/or includes openings or holes that allow light escape the device as the device is being operated. Also the holes are necessary to allow ions and water to flow in and out of the device as the device is being operated.

Figure 6:
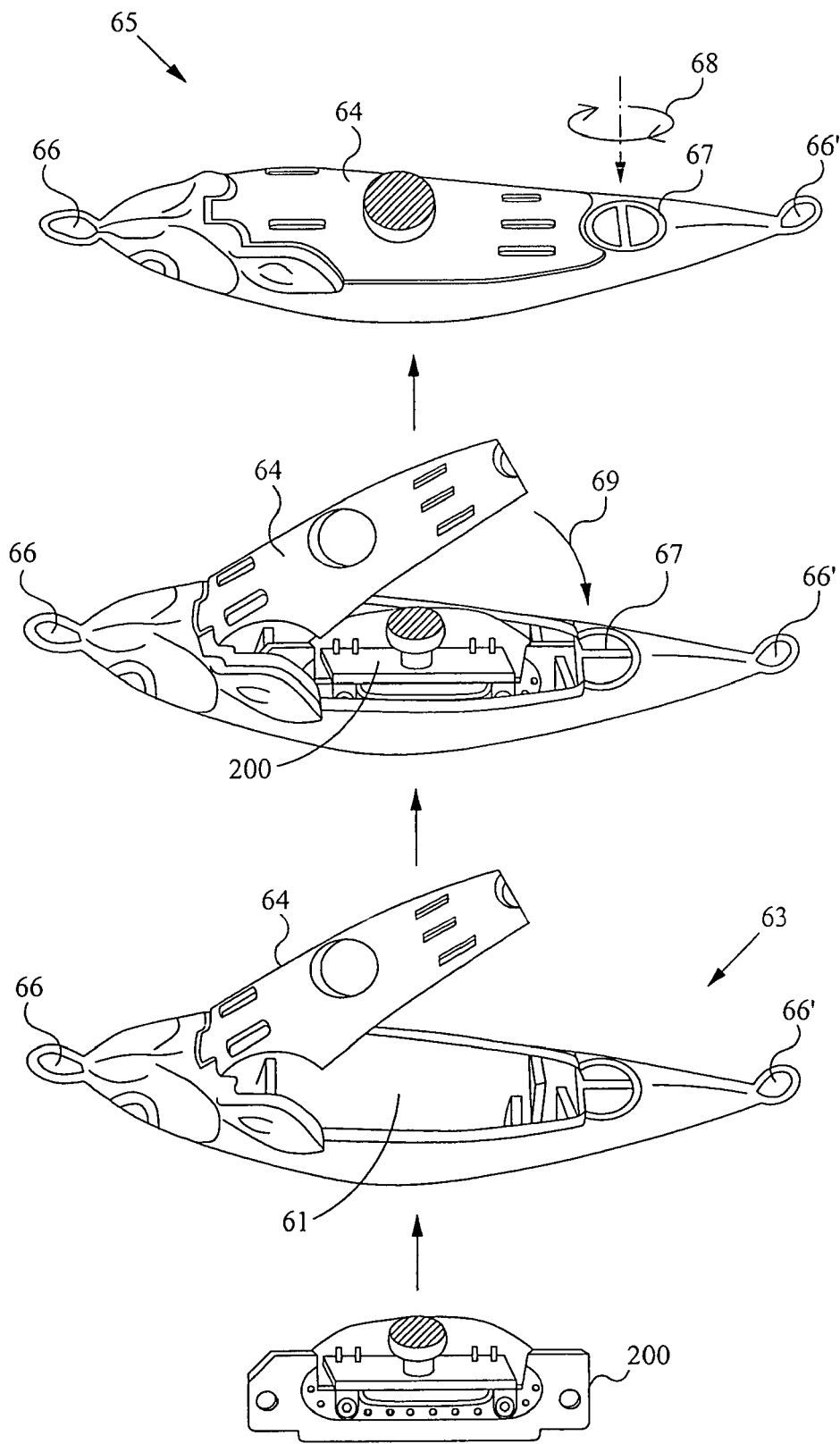

FIG. 6 shows a device with an electromagnetic module 200, such as described above. The device further includes housing structure 63 with a cavity 61 and a hinged door 64. In operation, the electromagnetic module 200 fits into the cavity 61 and the hinged door 64 is shut, as indicated by the arrow 69. The hinged door 64 is then secured in a closed position by moving a securing mechanism 67, as indicated by the arrow 68 to form a functional fishing lure 65 that resembles or represents a small fish or minnow. The housing structure 63 can also be fashioned with rings, loops or hooks 66 and 66' for attaching the fishing lure 65 to fishing equipment. The housing structure 63 is translucent and preferably has holes, slots or vents to allow light to escape and allow water and ions to flow into and out of the device.

Figure 7:
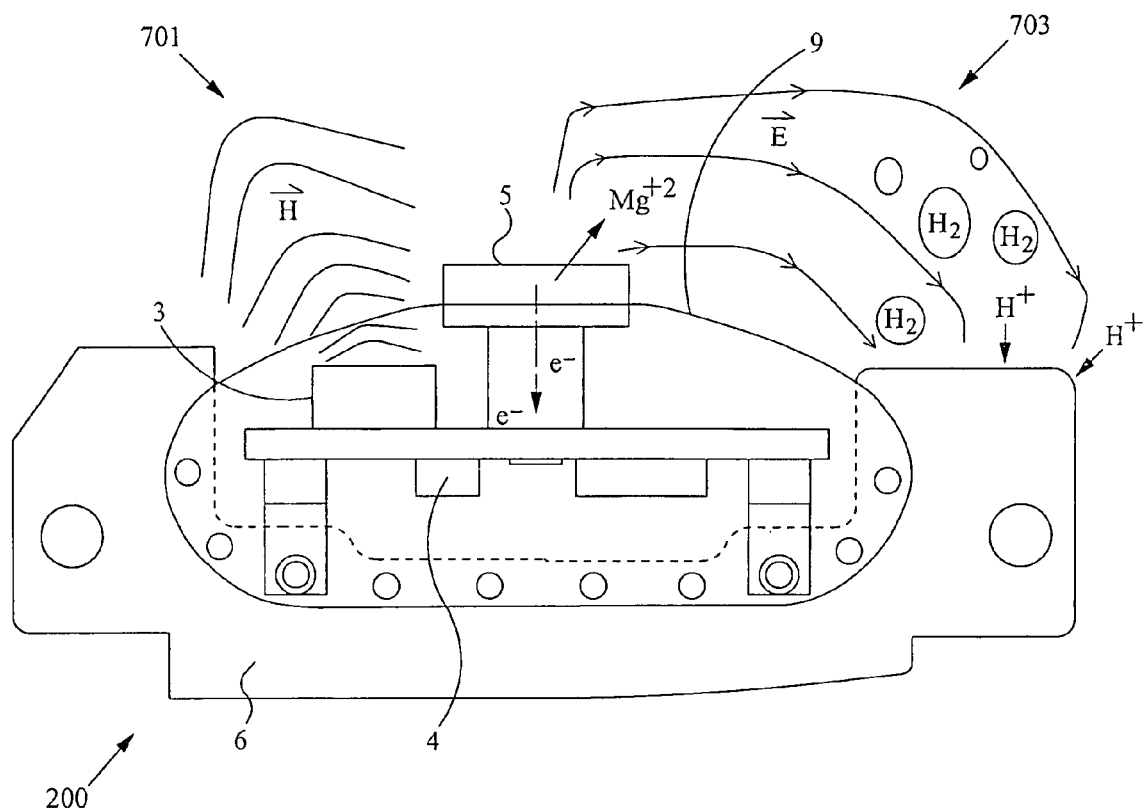
FIG. 7 shows a representation of magnetic and electric fields generated by an electromagnetic module, in accordance with the embodiments of the invention.

FIG. 7 is a representation of a electromagnetic module 200 in sea water and showing the generation of a magnetic field (H) 701 around the inductor 3 and a micro electric field (E) 703 between electrodes 5 and 6 of the electromagnetic module 200, according to the principle of invention.

With the electrochemical reaction of the magnesium anode 5 and gold cathode 6 in salt water immersion shown in FIG. 7, the dynamic electric field (E) and voltage difference between the surfaces of anode and cathode of the device are also built up and spread away continuously. The surrounding fish and marine organisms in the sea are able to sense the alternating electromagnetic field strength and signal.

The field strengths of the magnetic field (H) 701 and electric field (E) 703 generated are directly proportional to the total current consumption of ASIC1 (FIG. 11), ASIC2 (FIG. 12) and LED 4. The dissolving rate of the magnesium anode and current going through the inductor (3) synchronize with the rate of changing current and light blinking frequency of LED 4. When the light of LED 4 is blinking and changing frequently or glowing strongly, the field strengths and changing frequency of EM fields respond proportionally.

Figure 8:
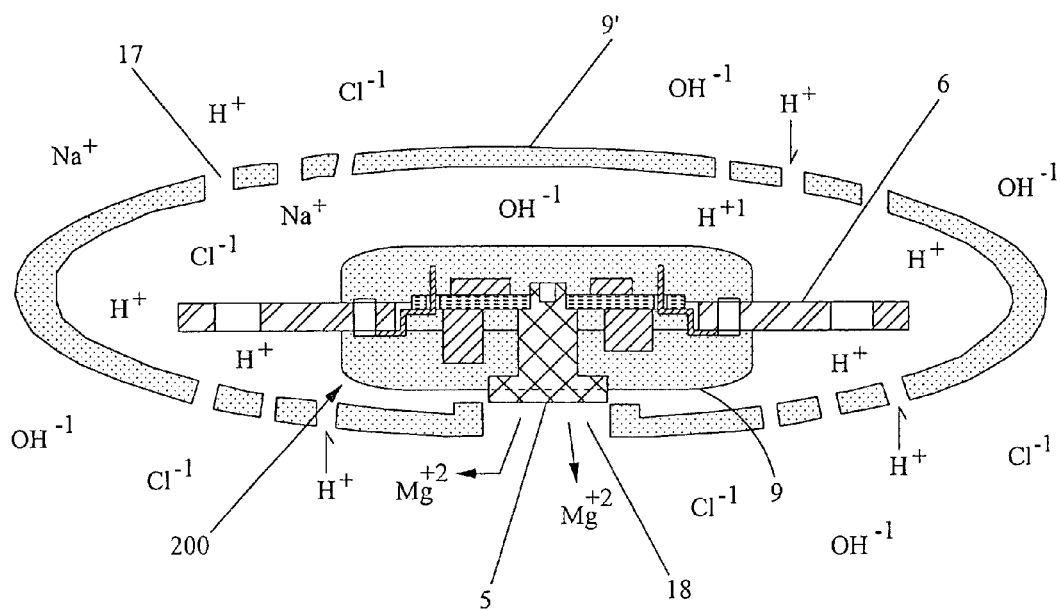
FIG. 8 shows a representation of ions migrating to and from an electromagnetic module through a housing structure or jacket with holes, slots or vents, in accordance with the embodiments of the invention.

FIG. 8 is a representation of the electromagnetic module 200 with a translucent waterproof enclosure in sea water. FIG. 8 shows migration of ions in and out of a translucent housing structure and/or jacket 9' with holes, slots or vents 17 and 18. The ions are generated from or at the electrodes 5 and 6 as well as provided naturally by the sea water.

Figure 9:
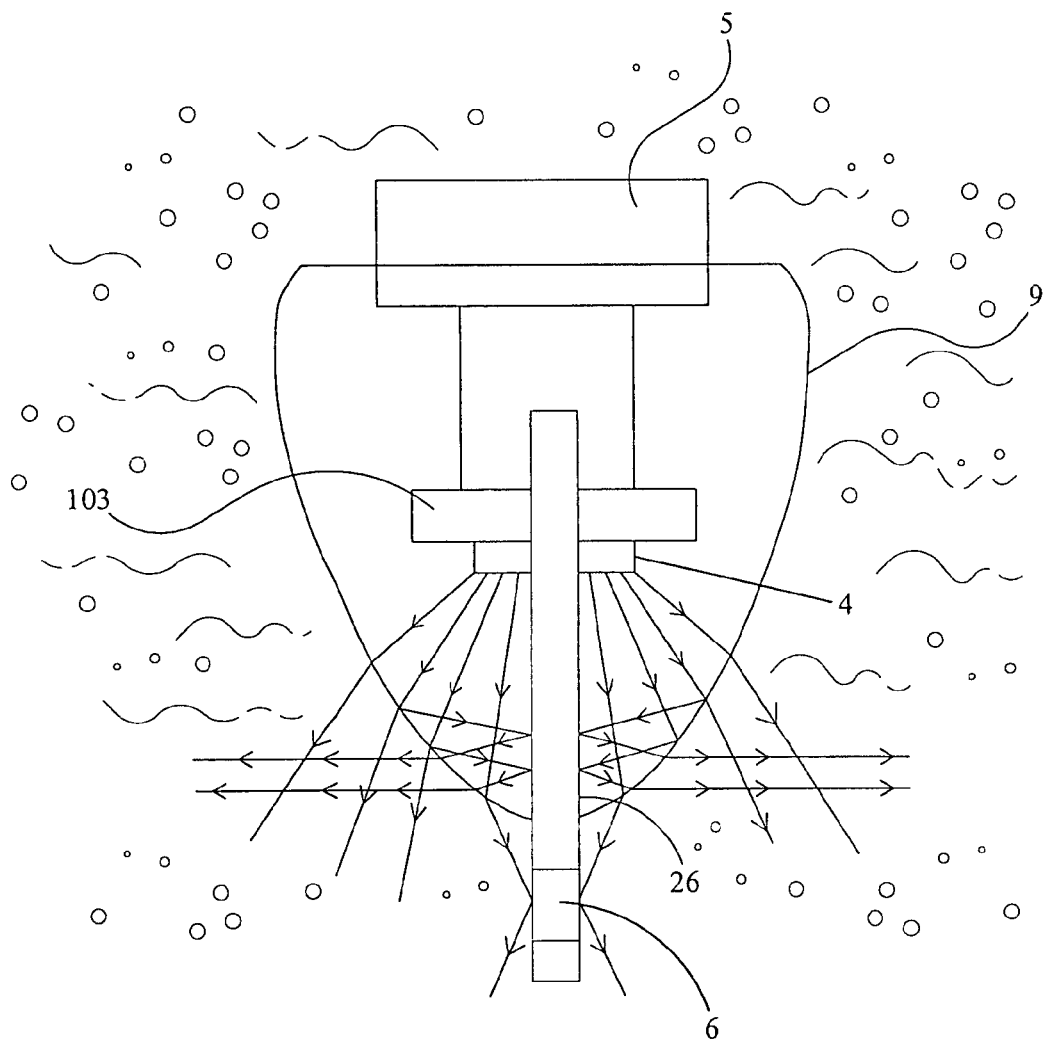
FIG. 9 shows an electromagnetic module with a reflective electrode, in accordance with the embodiments of the invention.

FIG. 9 shows the electromagnetic module 200 with an inductor 3, a light emitting diode 4 and electrodes 5 and 6, such as described in detail above. The electrode 6 has one or more reflective surfaces 26 that reflect light emitted by the light emitting diode 4. Note that the light beams emitting from the light emitting diode 4 can be internally reflected several times before being emitted through a translucent waterproof enclosure 9. In this way the reflective surfaces 26 of the electrode 6 and the translucent waterproof enclosure 9 act as an optical diffuser to generate diffuse light emitted from the electromagnetic module 200.

Figure 11:
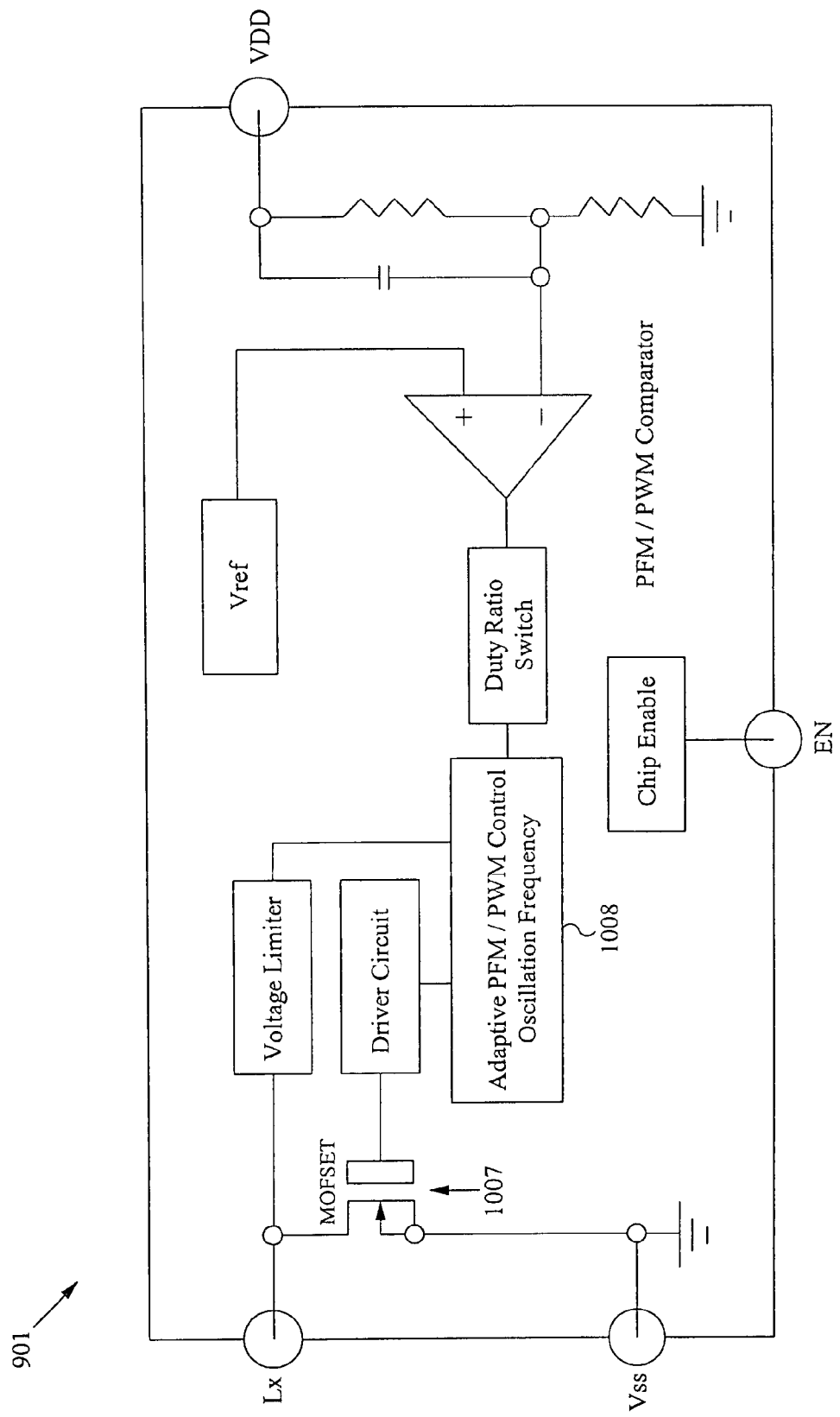
FIG. 11 shows a first application specific integrated circuit (ASIC1) for converting power from a dry battery to an operating voltage, in accordance with the embodiments of the invention.

FIG. 10 shows a schematic representation of a control circuit used to control the voltage output and light out from an electromagnetic module, in accordance with the embodiments of the invention. In operation, a source current from the dry battery 105 passes through an inductor 3 and is impulsively shunted to Vss by switching on and off an internal MOSFET 1007 (FIG. 11) of the first application specific integrated circuit (ASIC1) 901. The switching frequency of the MOSFET 1007 is about 100 Khz with an automatic switching duty ratio. The switching current going through the inductor 3 generates the 100 Khz alternating electro-magnetic field which is propagated through the waterproof enclosure 9 (FIG. 7). The application specific integrated circuit (ASIC1) 901 is primarily responsible for generating operating voltages from the dry battery 105, generate the field from the inductor 3 and power the second application specific integrated circuit (ASIC2) 903. The primary responsibility of the second application specific integrated circuit (ASIC2) 903 is to operate and pulse the light emitting diode 4. It will be clear to one skilled in the art that a control circuit of the present invention can include any number of resistors, capacitors 909 or other electronic components required for the proper operation of an electromagnetic module 200 in accordance with the embodiments of the invention FIG. 11 shows the first application specific integrated circuit (ASIC1) 901 for converting power from a dry battery 105 to an operating voltage, in accordance with the embodiments of the invention. The application specific integrated circuit (ASIC1) 901 employs a negative feedback loop of the duty ratio switch and adaptive PFM/PWM control for switching the MOSFET 1007 at a frequency to drive the inductor 3 and to convert the energy of the dry battery 105 to the operating voltage VDD.

Figure 12:
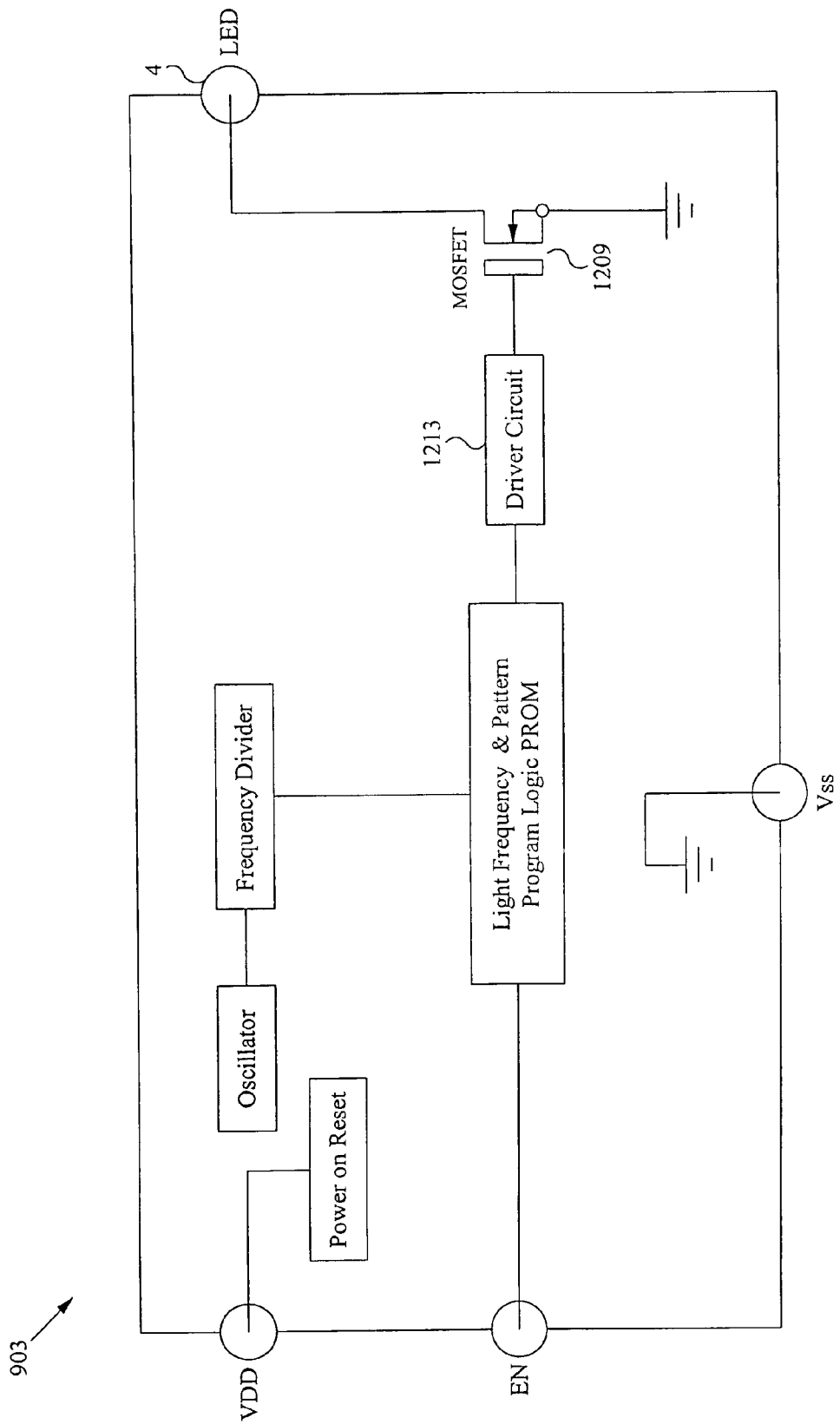
FIG. 12 shows a second application specific integrated circuit (ASIC2) for generating a pulsed output from a light emitting diode, in accordance with the embodiments of the invention.
Figure 13A:
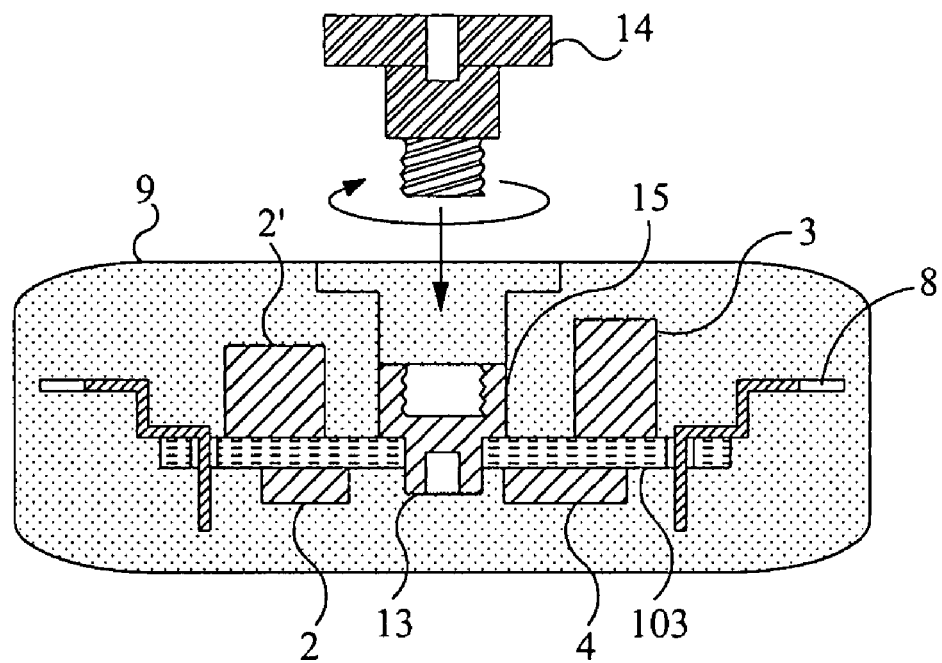
FIGS. 13A-B show representations of an electromagnetic module with a removable electrode, in accordance with the embodiments of the invention
Figure 13B:
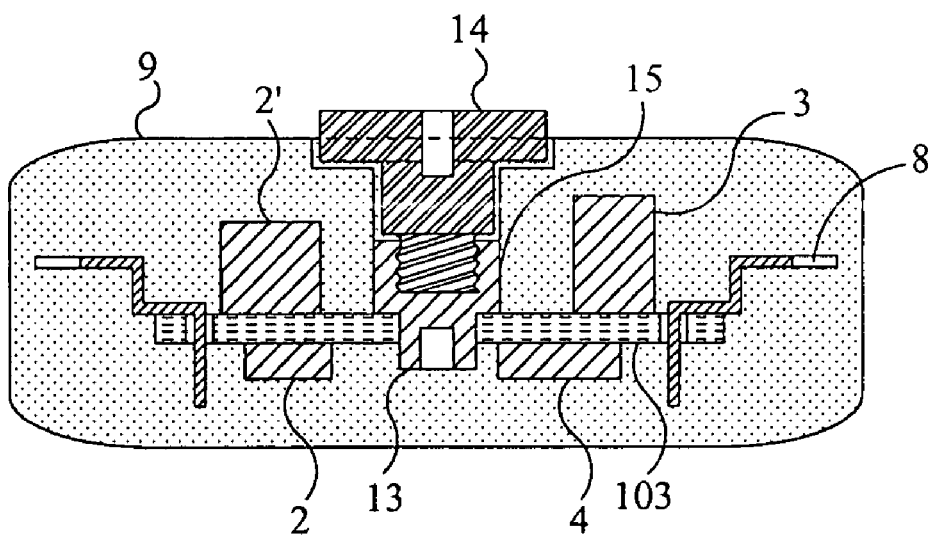

FIG. 12 shows a second application specific integrated circuit (ASIC2) 903 generating a pulsed output from a light emitting diode 4, in accordance with the embodiments of the invention. The second application specific integrated circuit (ASIC2) 903 can be programmed generate a single blink, a multi-blink, fading light, static light patterns or any other suitable lighting sequence generated by the light emitting diode 4. The lighting sequence generated by the light emitting diode 4 is programmed through a logic PROM of the second application specific integrated circuit (ASIC2) 903. The control circuit 103 can also include a user interface that allows a user to select from several pre-programmed lighting sequence and/or program a new lighting sequence. The pulsed light source or light emitting diode 4 is switched by an embedded driver circuit 1213 and a MOSFET 1209. Communication between the first application specific integrated circuit (ASIC1) 901 and the second application specific integrated circuit (ASIC2) 903 is controlled by the data pin EN. young FIGS. 13A-B show a representation of an electromagnetic module with a removable electrode, in accordance with further embodiments of the invention. The electromagnetic module includes one or more application specific integrated circuits 2 and 2', one or more light emitting diodes 4, a control circuit 103, an inductor 3, a solder tab 8, and a translucent waterproof enclosure 9, such as described in detail above. The electromagnetic module also include electrodes, wherein at least one of the electrodes is a removable electrode 14. The removable electrode 14 is configured to be replaced when it is worn out or corroded. Where the electrodes include a magnesium anode and a gold cathode, as described above, the removable electrode 14 is preferably the magnesium electrode. The removable electrode 14 can be fashioned in a shape of a threaded structure that is screwed into a matched threaded cavity 15 to make electrical contact with the control circuit 103 through electrical contacts 13.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A device comprising:
   a) a dry battery that is activated by exposure to an aquatic environment, wherein the dry battery includes at least one gold electrode and one magnesium electrode;
   b) a light source electrically coupled to the dry battery and powered by the dry battery in the aquatic environment; and
   c) a control circuit electrically coupled to the dry battery and the light source for controlling an output of the light source in the aquatic environment.

2. The device of claim 1, wherein the light source includes at least one light emitting diode.

3. The device of claim 1, wherein the control circuit includes a voltage conversion application specific integrated circuit for regulating the power applied to the light source using pulsed frequency modulation or pulsed width modulation switching.

4. The device of claim 1, wherein the control circuit includes an output application specific integrated circuit for selecting the output of the light source in the aquatic environment.

5. The device of claim 1, further comprising a housing that simulates an aquatic species.

6. The device of claim 5, wherein surfaces of one or more of the device and the housing includes a fluorescent material.

7. The device of claim 5, wherein the device is configured to detachably couple the housing.

8. The device of claim 1, includes a least one optical modulator for modulating an output of the light source from the module, wherein the optical modulator comprises one or more of a reflector, a diffuser and a lens.

9. A device comprising:
   a) electromagnetic module comprising
      i) a dry battery with a first electrode and a second electrode, wherein at least one of the first electrode and second electrode includes a surface with a fluorescent material;
      ii) a control circuit for controlling an output voltage from the dry battery;
      iii) a light source electrically coupled to the dry battery through the control circuit, wherein the dry battery energizes the light source when portions of the first electrode and the second electrode are submersed in an aquatic environment comprising ions; and
   b) one or more housing structures for holding the electromagnetic module and emitting light that is generated from the light source therefrom.

10. The device of claim 9, wherein portions of the electrodes, the control circuit and the light source are sealed within a translucent enclosure.

11. The device of claim 9, wherein the first electrode comprises magnesium and the second electrode comprises gold.

12. The device of claim 9, wherein the anode is removable from the dry battery.

13. The device of claim 9, wherein the control circuit is configured to generate pulsed light from the light source.

14. The device of claim 13, wherein the control circuit includes an application specific circuit configured for selecting a pulse rate that the light source generates the pulsed light.

15. The device of claim 9, wherein the one or more housing structures are fashioned into aquatic species and include holes, apertures or vents that release gas.

16. The device of claim 9, wherein the light source includes one or more light emitting diodes.

17. A method of making an aquatic device, the method comprising:
   a) forming a control circuit electrically coupled to a light source and configured to control the light source and an inductor for generating a magnetic field (H) in an aquatic environment;
   b) electrically coupling a dry battery with electrodes to the control circuit, wherein the dry battery is configured to power the light source through the control circuit with at least a portion of the electrodes in contact with the aquatic environment and generate an electric field (E) in the aquatic environment; and
   c) encasing the control circuit and the light source in a translucent waterproof enclosure, to thereby form an electromagnetic module.

18. The method of claim 17, further comprising forming housing structures that represent aquatic species, each of which are configured to interchangeably couple to the electromagnetic module.

19. The method of claim 18, wherein the control circuit is configured to pulse light from the light source.

20. The method of claim 18, wherein the control circuit includes a user interface for selecting a frequency that the light is pulsed from the light source.

21. A device comprising:
   a) a dry battery that is activated by exposure to an aquatic environment and generates an electric field (E) in the aquatic environment;
   b) a light source electrically coupled to the dry battery and powered by the dry battery in the aquatic environment;
   c) a control circuit with an inductor that is electrically coupled to the dry battery and the light source for controlling an output of the light source, wherein the inductor generates a magnetic field (H) in the aquatic environment; and
   d) translucent waterproof enclosure encasing light source and the control circuit.

22. The device of claim 21, wherein dry battery further generates gas in the aquatic environment.

23. A device comprising:
   a) a dry battery that is activated by exposure to an aquatic environment;
   b) a light source electrically coupled to the dry battery and powered by the dry battery in the aquatic environment;
   c) a control circuit electrically coupled to the dry battery and the light source for controlling an output of the light source in the aquatic environment; and
   d) a user interface for selecting an output of the light source in the aquatic environment.

24. The device of claim 23, wherein the dry battery generates gas in the aquatic environment.

* * * * *